Feb. 20, 1968  J. J. ERTESZEK  3,369,279
STOCKING GRIPPER
Filed May 25, 1966
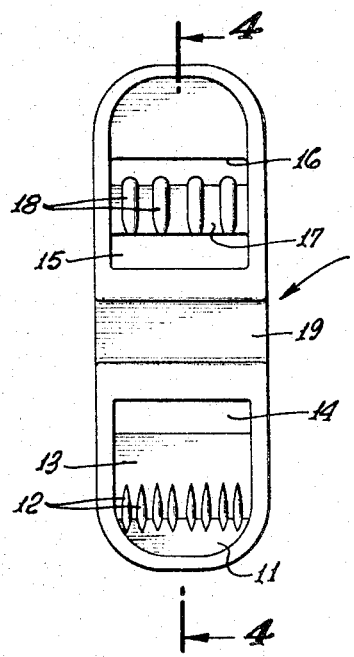
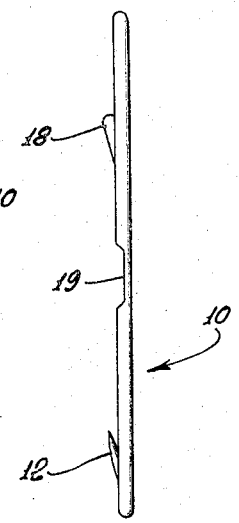
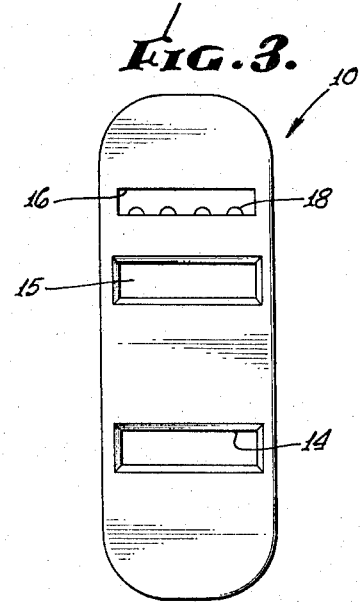
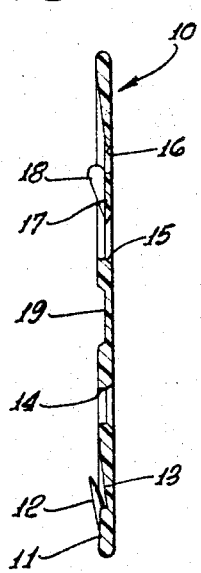
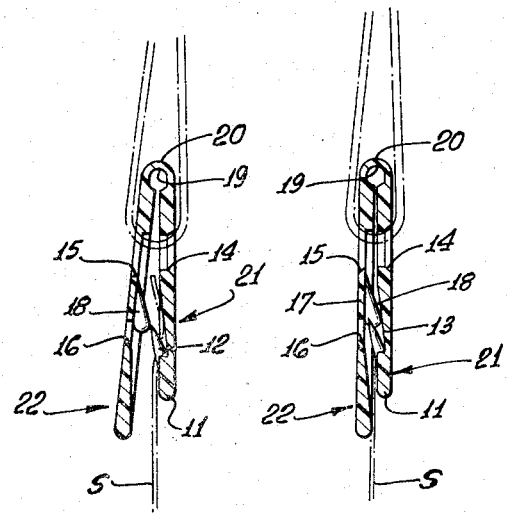
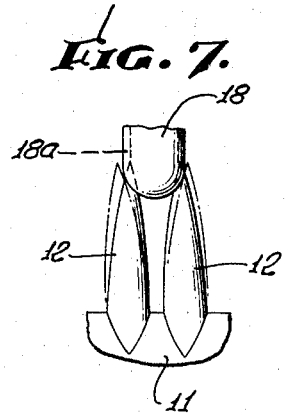
INVENTOR.
JAN J. ERTESZEK
BY *White & Haefliger*
ATTORNEYS.

United States Patent Office 3,369,279
Patented Feb. 20, 1968

3,369,279
STOCKING GRIPPER
Jan J. Erteszek, 631 Bonhill Road,
Los Angeles, Calif. 90049
Filed May 25, 1966, Ser. No. 568,691
5 Claims. (Cl. 24—245)

ABSTRACT OF THE DISCLOSURE

The invention provides a novel stocking fastener in the form of thin essentially flat resilient material doubled at its upper edge to form opposed depending legs to receive the stocking between them, one of the legs having inside teeth and the other leg having inside keeper lugs spaced to receive the teeth between them and proportioned to releasably retain the teeth.

---

This invention has to do with improvements in garter grips or stocking fasteners, and has for its general object to provide a novel one piece fastener configuration and construction achieving the desirable results of flatness in form and therefore concealability, as well as ease in use and the ability to securely hold and retain an attached stocking.

My general object is to provide such a fastener in essentially flat and thin form which in use may be supported below or inside a garment, such as a girdle, to present no observable bulge as frequently occurs with conventional garter grips.

Structurally the invention contemplates making the fastener of relatively thin resilient flat material doubled at an upper edge to form a hinge from which depending legs tend to spread by reason of the resiliency of the material. The inner surface of one of the legs is deformed to present upwardly directed teeth and the opposed leg surface is deformed to provide keeper means so engageable by the teeth as to releasably hold the legs together in flattened condition, from which the legs are spreadable to receive a stocking for penetration by the teeth.

Preferably the fastener is formed as a single piece molded of suitable resilient plastic composition, and in a manner shaping the keeper means as spaced projections which receive the teeth between them and cause such deflection of the teeth as will releasably hold the legs flatly together until spread to receive the stocking.

All the features and objects of the invention, as well as the detailed configurations of an illustrative embodiment, will be understood more fully from the following description of the accompanying drawing, in which:

FIG. 1 is a view showing the inside configuration of the fastener in its initial distended molded form;

FIG. 2 is a side elevation of FIG. 1;

FIG. 3 is a view showing the side of the fastener opposite FIG. 1 and which becomes the fastener exterior when doubled;

FIG. 4 is a cross section on line 4—4 of FIG. 1;

FIGS. 5 and 6 are sectional views showing the fastener respectively in open and closed condition in its doubled use condition; and FIG. 7 is a fragmentary enlarged view showing the interlocking relation between the teeth and a keeper projection.

Referring first to FIGS. 1 to 4, the fastener body generally indicated at 10 is shown to be made of relatively thin resilient material, and preferably to be molded in its unitized configuration inclusive of the later described teeth and retaining projections, of a suitable plastic composition having sufficient resiliency as to tend to open as in FIG. 5 from the closed condition of FIG. 6.

As molded, the body 10 has a bottom slightly thickened portion 11 to which is integrally molded a row of upwardly directed teeth 12 which project outwardly opposite a somewhat reduced thickness area 13 so that the teeth may be thrust into a stocking. Above the area 13 the body has a transverse slot 14 registerable in the doubled condition of the fastener with slot 15 to accommodate a support such as a garter strap. As viewed in FIG. 1 the body has between slot 15 and a third slot 16 a transverse web 17 to which is integrally molded a series of projections 18 which may correspond in number to one-half the number of teeth 12. As molded, the projections 18 may be extended slightly into the slot 16. Between slots 14 and 15, the body thickness is reduced at 19 to permit folding to the FIGS. 5 and 6 configurations, the fold then becoming along essentially a top edge 20 constituting a resilient hinge for the doubled sections of the fastener denoted generally as legs 21 and 22.

In the doubled condition of the fastener the terminal extents of the teeth 12 are brought opposite the ends of projections 18 adjacent slot 16 and in the relationship illustrated by FIG. 7. There it is shown that the teeth and projections are in such offset and width relationship that as legs 21 and 22 are closed to the FIG. 6 condition, the adjacent teeth are brought against the sides of an intervening projection 18 so that the teeth deflect outwardly and thus resiliently and frictionally engage the projection to releasably hold the legs in closed condition. Retention of the teeth by the projections may be increased by so shaping the sides of the projections as to provide recesses or undercuts 18a to receive the teeth terminals.

In using the fastener, the legs are opened as in FIG. 5 and the top of the stocking S brought between the teeth and keeper projections. By then closing the legs the teeth enter the stocking as in FIG. 6 and the teeth are brought into the described deflected interengagement with the keeper lugs to hold the fastener closed until the legs are manually spread to release the stocking from the teeth.

I claim:
1. A stocking fastener formed of relatively thin essentially flat resilient material doubled along an upper edge to form opposed depending legs hinged at said edge to be spreadable, upwardly and inwardly directed teeth on the inside of one of said legs, and keeper means on the inside of the other leg opposite said teeth and adapted to receive terminal extents of the teeth, said keeper means including projections between which the teeth are receivable, and said teeth engage and are laterally deflected by said projections to releasably hold the legs against spreading.

2. A fastener according to claim 1, in which said material is a single piece of resilient plastic composition shaped to form said legs, teeth and keeper projections.

3. A fastener according to claim 2, in which said teeth are spaced apart in a row transversely on one leg and the keeper projections are arranged in an opposed row on the other leg and individually are wider than the teeth spacing so as to deflect and releasably retain the teeth when they are brought between the projections.

4. A fastener according to claim 3, in which said projections are elongated longitudinally of said other leg and terminate at a transverse slot therein.

5. A fastener according to claim 4, in which the legs have registering stocking support slots between said upper edge and transverse slot.

References Cited

UNITED STATES PATENTS

| | | | |
|---|---|---|---|
| 484,819 | 10/1892 | Rabitte | 24—259 |
| 1,081,852 | 12/1913 | Mierswik | 24—243.8 |
| 2,542,077 | 2/1951 | Gershen | 16—87.2 |
| 3,028,648 | 4/1962 | Renaud | 24—245 |
| 3,137,027 | 6/1964 | Birkle | 16—87.2 |
| 3,177,550 | 4/1965 | Borgeson | 24—245 |

OTHELL M. SIMPSON, *Primary Examiner.*

WILLIAM FELDMAN, *Examiner.*

G. WEIDENFELD, *Assistant Examiner.*